(12) United States Patent
Ayala et al.

(10) Patent No.: US 9,404,055 B2
(45) Date of Patent: Aug. 2, 2016

(54) SYSTEM AND METHOD FOR THE PREPARATION OF COAL WATER SLURRIES

(71) Applicant: General Electric Company, Schenectady, NY (US)

(72) Inventors: Raul Eduardo Ayala, Sugar Land, TX (US); Judith Pauline Oppenheim, Friendswood, TX (US)

(73) Assignee: General Electric Company, Schenectady, NY (US)

( * ) Notice: Subject to any disclaimer, the term of this patent is extended or adjusted under 35 U.S.C. 154(b) by 562 days.

(21) Appl. No.: 13/756,364

(22) Filed: Jan. 31, 2013

(65) Prior Publication Data

US 2014/0208649 A1 Jul. 31, 2014

(51) Int. Cl.
*B01J 7/00* (2006.01)
*C01B 3/36* (2006.01)
*C10L 1/32* (2006.01)

(52) U.S. Cl.
CPC ............... *C10L 1/326* (2013.01); *Y02E 20/16* (2013.01); *Y02E 20/18* (2013.01)

(58) Field of Classification Search
CPC ................................ C10L 1/326; C10L 1/322
See application file for complete search history.

(56) References Cited

U.S. PATENT DOCUMENTS

| | | | |
|---|---|---|---|
| 3,617,003 A | 11/1971 | Winegartner | |
| 3,867,109 A | 2/1975 | Wasp | |
| 4,049,203 A | 9/1977 | McKenzie | |
| 4,358,293 A | 11/1982 | Mark | |
| 4,412,843 A | 11/1983 | Burgess et al. | |
| 4,487,684 A | 12/1984 | Wurfel | |
| 4,500,041 A | 2/1985 | Nakaoji et al. | |
| 4,526,585 A | 7/1985 | Burgess et al. | |
| 4,584,094 A * | 4/1986 | Gadsby | B03B 5/34 209/17 |
| 4,598,873 A | 7/1986 | Cleemann | |
| 4,620,672 A | 11/1986 | Leibson et al. | |
| 4,636,224 A | 1/1987 | Dilling | |

(Continued)

FOREIGN PATENT DOCUMENTS

| | | |
|---|---|---|
| CN | 201382433 | 1/2010 |
| CN | 2013/0038770.0 | 1/2013 |

(Continued)

OTHER PUBLICATIONS

J.S. Chong, E.B. Christiansen and A.D. Baer, Effect of bimodal particle size distribution on viscosity of concentrated suspensions, Journal of Applied Polymer Science vol. 15 pp. 2007-2021 (1971), Rheology of Concentrated Suspensions.

(Continued)

*Primary Examiner* — Imran Akram
(74) *Attorney, Agent, or Firm* — Fletcher Yoder, P.C.

(57) ABSTRACT

Disclosed embodiments include a feedstock preparation system that includes a first slurry preparation system that may receive a first portion of a solid fuel to generate a first fuel slurry using the first portion of the solid fuel and a liquid and second slurry preparation system separate from the first slurry preparation system that may receive a second portion of the solid fuel and the first fuel slurry. The second slurry preparation system may produce a second fuel slurry using the second portion of the solid fuel and the first fuel slurry. The first fuel slurry has a first particle size distribution and the second fuel slurry has a second particle size distribution, and the first and second particle size distributions are different.

17 Claims, 3 Drawing Sheets

(56) References Cited

U.S. PATENT DOCUMENTS

| | | | |
|---|---|---|---|
| 4,759,632 A * | 7/1988 | Horiuchi | E02D 17/18 366/118 |
| 4,787,918 A | 11/1988 | Ho | |
| 4,826,588 A | 5/1989 | Klimpel et al. | |
| 4,863,489 A | 9/1989 | Suggitt | |
| 4,881,946 A | 11/1989 | Vettor et al. | |
| 4,897,088 A | 1/1990 | Ishikawa et al. | |
| 4,912,256 A | 3/1990 | Cronje | |
| 5,012,984 A | 5/1991 | Ishikawa et al. | |
| 5,139,982 A | 8/1992 | Ayala et al. | |
| 5,188,811 A | 2/1993 | Ayala | |
| 5,380,342 A * | 1/1995 | Leonard et al. | 44/280 |
| 5,401,475 A | 3/1995 | Ayala et al. | |
| 5,753,198 A | 5/1998 | Ayala et al. | |
| 5,912,198 A | 6/1999 | Feitelberg et al. | |
| 6,207,120 B1 | 3/2001 | Belmonte et al. | |
| 6,432,368 B1 | 8/2002 | Feitelberg et al. | |
| 6,604,971 B1 | 8/2003 | Sun et al. | |
| 6,620,763 B1 | 9/2003 | Venkataramani et al. | |
| 6,630,568 B1 | 10/2003 | Johnson et al. | |
| 6,790,934 B2 | 9/2004 | Johnson et al. | |
| 7,070,746 B1 | 7/2006 | Notte et al. | |
| 7,132,052 B2 | 11/2006 | Rawson et al. | |
| 7,323,021 B2 | 1/2008 | Trass et al. | |
| 7,651,663 B2 | 1/2010 | Ayala et al. | |
| 7,901,646 B2 | 3/2011 | Ayala et al. | |
| 2004/0092785 A1 | 5/2004 | Mills | |
| 2010/0148122 A1 * | 6/2010 | Breton | C10J 3/54 252/373 |
| 2010/0187090 A1 | 7/2010 | Mazza et al. | |
| 2010/0244448 A1 * | 9/2010 | Ghani | F23K 1/02 290/52 |
| 2011/0179712 A1 | 7/2011 | Thacker et al. | |
| 2013/0045143 A1 * | 2/2013 | Steele | C10L 1/324 422/198 |
| 2013/0061516 A1 | 3/2013 | Zhang et al. | |
| 2013/0167441 A1 | 7/2013 | Sevastyanov | |
| 2014/0311024 A1 * | 10/2014 | Sakai | C10L 5/04 44/627 |

FOREIGN PATENT DOCUMENTS

| | | |
|---|---|---|
| EP | 0305047 B1 | 3/1989 |
| EP | 0337738 A2 | 10/1989 |
| EP | 0339853 A1 | 11/1989 |
| EP | 0314825 B1 | 2/1993 |
| EP | 0327386 B1 | 6/1994 |
| WO | 2012101964 | 2/2012 |
| WO | 2012101963 A1 | 8/2012 |

OTHER PUBLICATIONS

John Keith Beddow, Particulate Science and Technology, Chapter 3, Chemical Publishing Co. NY, NY, 1980.

Robert H. Perry and Don W. Green, Crushing and Grinding Practice, Section 20, Perry's Chemical Engineers' Handbook, 7th Edition, 1997.

* cited by examiner

SYSTEM AND METHOD FOR THE PREPARATION OF COAL WATER SLURRIES

BACKGROUND OF THE INVENTION

The subject matter disclosed herein relates to a system and method for concentrating a solid fuel in a slurry prior to gasification.

Synthesis gas or "syngas" is a mixture of carbon monoxide (CO) and hydrogen ($H_2$) and other components present in lesser degrees, such as carbon dioxide ($CO_2$). Syngas has a number of uses, such as in power generation, steam generation, heat generation, substitute natural gas (SNG) production, as well as chemical synthesis. Syngas can be produced using gasification processes, which utilize a solid, liquid, and/or gaseous carbonaceous fuel source such as coal, coke, oil, and/or biomass, to react with oxygen ($O_2$) to produce the syngas within a gasifier. While certain carbonaceous fuels may be provided to the gasifier directly, solid carbonaceous fuel sources are often provided to the gasifier as a fuel slurry, where the solid fuel is dispersed within a liquid, such as water. The liquid is used to facilitate flow of the solid fuel into the gasifier as well as to facilitate dispersal of the solid fuel within the gasifier, for example to increase gasification efficiency. Unfortunately, the presence of liquid in the slurry reduces the energy content of syngas produced per unit weight of feed as compared with other more concentrated fuel sources, such as liquid, solids, or gaseous feeds.

BRIEF DESCRIPTION OF THE INVENTION

Certain embodiments commensurate in scope with the originally claimed subject matter are summarized below. These embodiments are not intended to limit the scope of the claimed subject matter, but rather these embodiments are intended only to provide a brief summary of possible forms of the invention. Indeed, the present disclosure may encompass a variety of forms that may be similar to or different from the embodiments set forth below.

In a first embodiment, a feedstock preparation system includes a first slurry preparation system that may receive a first portion of a solid fuel to generate a first fuel slurry using the first portion of the solid fuel and a liquid and second slurry preparation system separate from the first slurry preparation system that may receive a second portion of the solid fuel and the first fuel slurry. The second slurry preparation system may produce a second fuel slurry using the second portion of the solid fuel and the first fuel slurry. The first fuel slurry has a first particle size distribution and the second fuel slurry has a second particle size distribution, and the first and second particle size distributions are different.

In a second embodiment, a method includes providing a first portion of a solid fuel to a first slurry preparation system to generate a first fuel slurry. The first slurry includes ground particles of the solid fuel. The method also includes providing a second portion of the solid fuel and a first portion of the first fuel slurry to a second slurry preparation system, grinding a mixture of the second portion of the solid fuel and the first portion of the first fuel slurry in the second slurry preparation system to produce a second fuel slurry. The second fuel slurry has a smaller particle size distribution of the solid fuel compared to the first fuel slurry. The method further includes mixing a second portion of the first fuel slurry and the second fuel slurry to produce a third fuel slurry.

In a third embodiment, a system includes a controller that includes one or more tangible, non-transitory, machine readable media collectively storing one or more sets of instructions and one or more processing devices that execute the one or more sets of instructions. The system may monitor a parameter of a first fuel slurry provided to a gasifier. The first fuel slurry includes a mixture of a solid fuel and a liquid. The system may also adjust the composition of the first fuel slurry by adjusting an amount of a second fuel slurry produced by a first slurry preparation system provided to a second slurry preparation system that may produce the first fuel slurry using the second fuel slurry and the solid fuel.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

There is an interest in the gasification of low rank coal due to its reduced cost and relative availability, compared to other coals such as bituminous or anthracite coals. However, low rank coal may contain up to 30% by weight of water, making processing and gasification inefficient due to lower energy content. For example, during gasification, the excess water within low rank coals may be removed (e.g., evaporated), which consumes energy and reduces efficiency. The low rank coals may include, but are not limited to, sub-bituminous coals, lignite coals, or a combination thereof. In order to improve the gasification efficiency of low rank coals, higher concentrations of coal in the slurry may be desirable.

One way to enhance the solids concentration in accordance with the present disclosure may be to generate coal-water slurries having fine particles of coal. Present embodiments provide a system and method for preparing concentrated coal water slurries for gasification using fine particles of coal. For example, embodiments of the present disclosure may include a feedstock preparation system configured to produce a first fuel slurry having a first portion of a solid fuel (e.g. coal, biomass, petcoke) and a first concentration. The first fuel slurry may be produced such that the first portion of the solid fuel has a first particle size distribution. Furthermore, the feedstock preparation system may also produce a second fuel slurry having a second concentration. The second fuel slurry may include a second portion of the solid fuel and at least a portion of the first fuel slurry such that the second concentration is greater than the first concentration. The second fuel slurry may be produced such that the solid fuel has a second particle size distribution different from the first particle size distribution. Additional embodiments include a control system that may control an amount and/or a flow of the solid fuel, an amount and/or a flow first fuel slurry, and/or an amount and/or a flow second fuel slurry.

Figure 1:
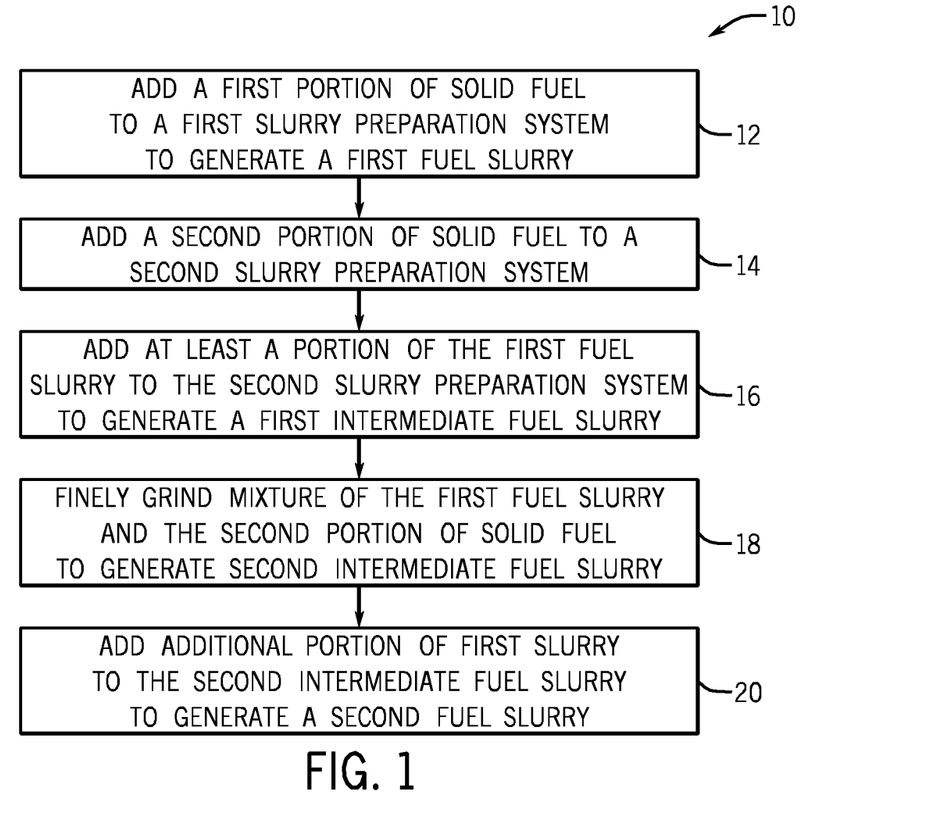
FIG. 1 is a block diagram of an embodiment of a method for producing a concentrated fuel slurry for use in a gasification system.

Turning now to the drawings, and referring to FIG. 1, a method 10 for producing a concentrated fuel slurry for use in a gasification system is illustrated. The method 10 includes providing a first portion of a solid fuel to a first slurry preparation system to generate a first fuel slurry (block 12). For example, the solid fuel may be ground into smaller particles to generate the first fuel slurry having a first particle size. While any particle size is presently contemplated, in one embodiment the first fuel slurry may have a particle size of between 40 and 1500 microns, such as between 100 and 400 microns, or approximately 200 microns.

In addition to providing a first portion of solid fuel to the first slurry preparation system, the method 10 also includes providing a second portion of the solid fuel to a second slurry preparation system (block 14). In certain embodiments, the second portion of the solid fuel may have an average particle size similar to that of the first portion of the solid fuel. In other embodiments, the second portion of the solid fuel may be processed (e.g., crushed) to produce an average particle size that is smaller than the first portion of the solid fuel. For example, the second portion of the solid fuel may be between 10% and 25% less than the first portion of the solid fuel. It should be noted that the solid fuel in the second portion may be the same or different from the solid fuel in the first portion. For example, the solid fuel in the first portion may include bituminous coal and the solid fuel in the second portion may include a low rank coal. In other embodiments, the first portion and the second portion may both include low rank coal.

Before, during, or after addition of the second portion of the solid fuel to the second slurry preparation system, at least a portion of the first fuel slurry is also added to the second slurry preparation system. In certain embodiments, the second portion of the solid fuel and the portion of the first fuel slurry are mixed in the second slurry preparation system to generate a first intermediate fuel slurry (block 16). By way of example, the first intermediate fuel slurry may have between approximately 1% and 30% more solid fuel relative to the first fuel slurry.

The method 10 also includes processing (e.g., grinding) the first intermediate fuel slurry to generate a second intermediate fuel slurry having a second particle size (block 18). The second particle size may be any suitable size and, in certain embodiments, is smaller than the first particle size. For example, in one embodiment, the second intermediate fuel slurry may have an average particle size of approximately 5% and 500% smaller than the first fuel slurry. In other embodiments, the second intermediate fuel slurry may have an average particle size of between 20% and 250%, 30% and 100%, or 50% and 75% smaller than the first fuel slurry. In other embodiments, the second intermediate fuel slurry may have an average particle size of between 30% and 100% smaller than the first particle size.

The method 10 also includes adding an additional portion of the first fuel slurry to the second intermediate fuel slurry to produce a second fuel slurry (block 20). The second fuel slurry may have a higher concentration of the solid fuel compared to the first fuel slurry. In certain embodiments, the second fuel slurry may have approximately 1% and 40% more solid fuel. Accordingly, the second fuel slurry may increase the amount of the solid fuel entering a gasifier by 1%, 2%, 3%, 4%, 5%, 6%, 7%, 8%, 9%, 10%, or more, compared to the first fuel slurry. Furthermore, by combining the additional portion of the first fuel slurry with the second intermediate fuel slurry, the particle size distribution of the second fuel slurry is such that the viscosity of the second fuel slurry may be equal to or less than the viscosity that would be obtained if there were only a single particle size distribution of the solid fuel.

Figure 2:
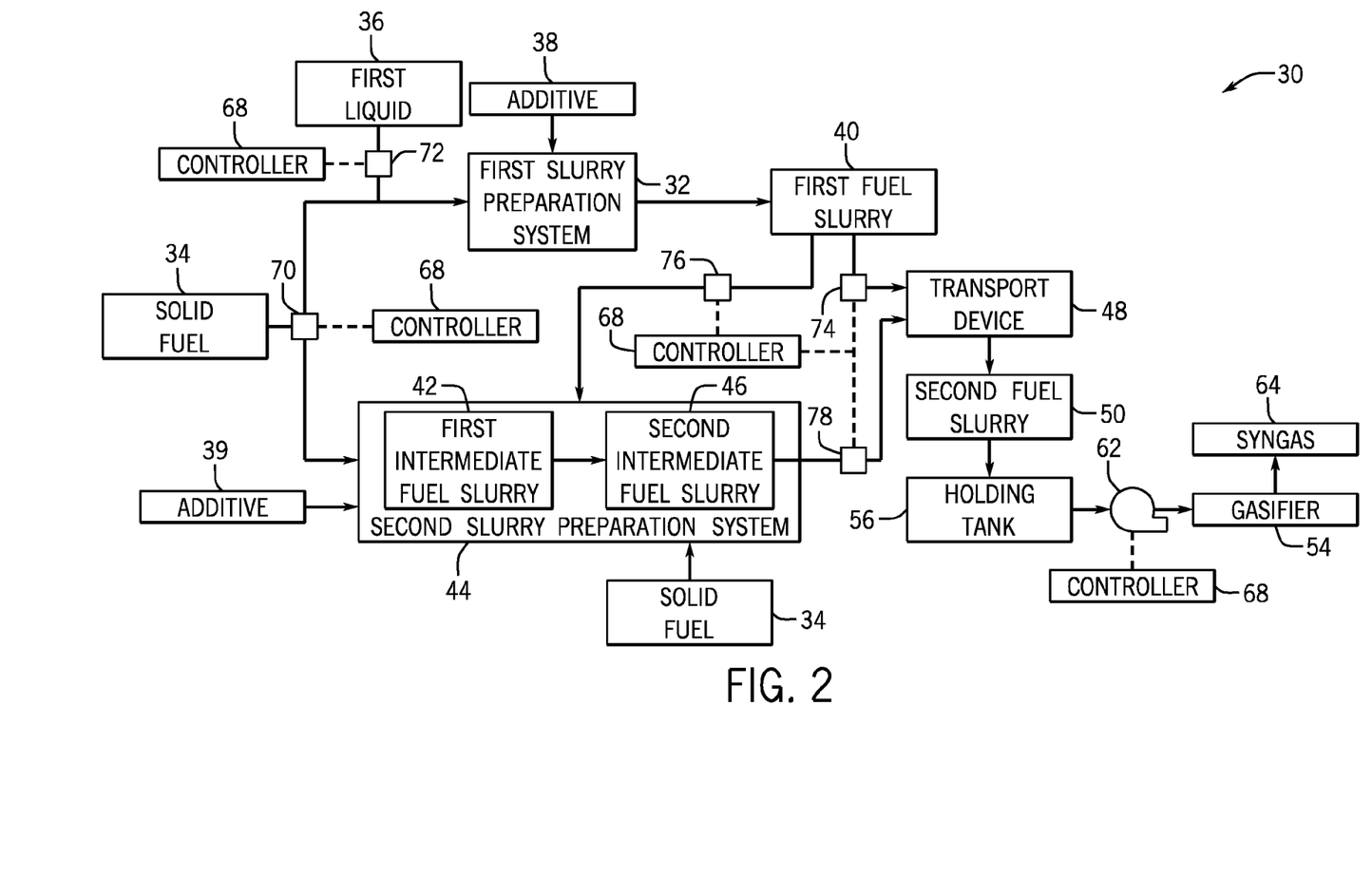
FIG. 2 is a block diagram of an embodiment of a feedstock preparation system for producing a concentrated fuel slurry for use in a gasification system.

Present embodiments also include a feedstock preparation system configured to perform the method 10 to prepare the second fuel slurry are presented. FIG. 2 is a block diagram of an embodiment of one such feedstock preparation system 30 that is configured to generate fuel slurries for gasification, and includes at least one slurry preparation system. Specifically, the system 30 includes a first slurry preparation system 32, which receives a first portion of a solid fuel 34, a first liquid 36, and/or an additive 38 (e.g., as a single or separate streams) to produce a first fuel slurry 40 (e.g., in accordance with the acts of block 12 (FIG. 1)). The first slurry preparation system 32 may include a grinder, a mill, or any similar unit that may produce smaller particles from large particles of the solid fuel 34 during operation. Furthermore, the first slurry preparation system 32 may include one or more agitation features such as, but not limited to, an impeller, a sonication system, or the like to mix the first portion of the solid fuel 34 and the first liquid 36 to generate the first fuel slurry 40 having a first concentration and a first particle size distribution.

As illustrated, the first liquid 36 may be introduced into the feedstock preparation system 30 upstream of the first slurry preparation system 32. However, in other embodiments, the first liquid 36 may be introduced directly into the first slurry preparation system 32. The first liquid 36 may include, but is not limited to, water, methanol, ethanol, or any combination thereof. In embodiments where the first liquid 36 includes water, the water may include fresh water, salt water, recycled water, or a combination thereof. By way of example, the recycled water may include, but is not limited to, grey water, produced water, boiler feed water, or any other suitable recycled water source.

In certain embodiments, the additive 38 may be introduced directly into the first slurry preparation unit 32 in a stream separate from the first liquid 36. Accordingly, the first slurry preparation system 32 may include one or more flow devices such as, but not limited to, a liquid pump, a dry feeder, a rotary feeder, an auger, a screw conveyer, a pneumatic conveyance system, a hopper, or a combination thereof to introduce the additives into the first fuel slurry 40. In other embodiments, the additive 38 may be mixed with the first liquid 36 upstream of the first slurry preparation unit 32. The additive 38 may include additives such as, but not limited to, friction reducers, free water agents, suspending agents, phase transfer agents and/or viscosity modifiers to facilitate transport of the first fuel slurry 40 away from the first slurry preparation system 32. For example, polymers such as, but not limited to, polysaccharides (e.g. xanthum gum, cellulose, and their derivatives), polyacrylamides, polyacrylates, polysulfuric acids, lignosulfonates, or any combination thereof may be used as additives that may facilitate transport of the first fuel slurry 40.

As discussed above, the first fuel slurry 40 is a mixture including at least the first portion of the solid fuel 34 and the first liquid 36. The solid fuel 34 may include a variety of carbonaceous fuels, such as coal, biomass, or any other carbonaceous fuel. In some embodiments, the solid fuel 34 may be sub-bituminous (low rank) coal, which contains a certain amount of inherent liquid (e.g., water). Furthermore, the solid fuel 34 in the first fuel slurry 40, after grinding, may have an average particle size of between 40 and 1500 microns, however any other suitable particle size may be produced. In one embodiment, the solid fuel 34 in the first fuel slurry 40 may have an average particle size of between approximately 100 and 400 microns. In another embodiment, the solid fuel 34 in the first fuel slurry 40 may have an average particle size of approximately 200 microns.

In order to increase the amount of solid fuel 34 in a fuel slurry that enters the gasifier, the first fuel slurry 40 is mixed with additional solid fuel to generate a first intermediate fuel slurry 42. As such, the system 30 also includes a second slurry preparation system 44 that prepares the first intermediate fuel slurry 42 during operation. The second slurry preparation system 44 receives a second portion of the solid fuel 34, a first portion of the first fuel slurry 40, and an additive 39 (e.g., as single or separate streams) to generate the first intermediate fuel slurry 42 (e.g., in accordance with blocks 14 and 16 (FIG. 1)). In one embodiment, the first intermediate fuel slurry 42 may also be generated by mixing the first fuel slurry 40 and the second portion of the solid fuel 34 with a second liquid such as, but not limited to, fresh water, salt water, recycled water, methanol, ethanol, or a combination thereof. By way of example, the recycled water may include, but is not limited to, grey water, produced water, boiler feed water, or any other suitable recycled water source.

In certain embodiments, the additive 39 may be introduced directly into the second slurry preparation unit 44 in a stream separate from the first portion of the first fuel slurry 40 and/or the second liquid. The additive 39 may be added to the second slurry preparation unit 44 via one or more flow devices such as, but not limited to, a liquid pump, a dry feeder, a rotary feeder, an auger, a screw conveyer, a pneumatic conveyance system, a hopper, or a combination thereof. In other embodiments, the additive 39 may be mixed with the first portion of the first fuel slurry 40 and/or the second liquid upstream of the second slurry preparation unit 44. The additive 39 may include, but is not limited to, friction reducers, free water agents, suspending agents, and/or phase transfer agents to adjust properties (e.g., viscosity, sedimentation stability, flowability, atomization, low-shear yield stress) of the first intermediate fuel slurry 42. For example, polymers such as, but not limited to polysaccharides (e.g. xanthum gum, cellulose, and their derivatives), polyacrylamides, polyacrylates, polysulfuric acids, ammonium lignosulfonates, ammonium lignocondensates, naphthalene condensates, or any combination thereof may be used to adjust the properties of the first intermediate fuel slurry 42.

As discussed in further detail below with reference to FIG. 3, the first intermediate fuel slurry 42 may enter a grinder, a mill, or any other similar unit that may produce smaller particles from large particles of the solid fuel 34 to produce a second intermediate fuel slurry 46 having a second concentration of the solid fuel 34 and a second particle size distribution. It should be noted that the second portion of the solid fuel 34 having the desired particle size may also be added directly to the second intermediate fuel slurry 46 to generate the second concentration of the solid fuel 34. In certain embodiments, the second concentration of the solid fuel 34 may be 1% and 40% higher than the first concentration of the solid fuel 34. For example, the second concentration of the solid fuel 34 may be between 5% and 40%, 10% and 30%, or 15% and 20% higher than the first concentration of the solid fuel 34. Furthermore, the solid fuel 34 in the second intermediate fuel slurry 46 may have a particle size between 10% and 500% smaller than the particles of solid fuel 34 in the first fuel slurry 40. For example, the second intermediate fuel slurry 46 may have particles of the solid fuel 34 that may be between 20% and 250%, 30% and 100%, or 50% and 75% smaller than the solid fuel 34 particles in the first fuel slurry 40.

As discussed above, the second intermediate fuel slurry 46 is, at least, a mixture of the first fuel slurry 40 and the second portion of the solid fuel 34. Accordingly, the second intermediate fuel slurry 46 may have a higher concentration of the solid fuel 34 compared to the first fuel slurry 40. Consequently, the second intermediate fuel slurry 46 may have a viscosity greater than that of the first fuel slurry 40. For example, the viscosity of the second intermediate fuel slurry 46 may be between 80% and 500% more, such as between 100% and 400%, or 200% and 300% more than the viscosity of the first fuel slurry 40. Therefore, during operation of the system 30, in addition to, or in lieu of features typically used to transport fluids, such as pumps, booster compressor, blowers, or the like, the second intermediate fuel slurry 46 may be transported via a solid transport device 48 to generate a second fuel slurry 50. In other words, in accordance with present embodiments, solids transport devices may be used to convey a high-concentration fuel slurry (e.g., greater than 50 wt % or 60 wt % solids on a dry basis).

Following preparation of the second intermediate fuel slurry 46, a second portion of the first fuel slurry 40 is added to the second intermediate fuel slurry 46 to generate the second fuel slurry 50. Due to the high viscosity of the second intermediate fuel slurry 46, the solid transport device 48 may be used to enable mixing of the second portion of the first fuel slurry 40 and the second intermediate fuel slurry 46 to produce a homogenous second fuel slurry 50 (e.g., according to the acts of block 20 (FIG. 1)). In one embodiment, the second portion of the first fuel slurry 40 and the second intermediate fuel slurry 46 enter the transport device 48 as a single stream. In another embodiment, the second portion of the first fuel slurry 40 and the second intermediate fuel slurry 46 enter the transport device 48 as separate streams. The transport device 48 may include one or more screw conveyers, globe pumps, diaphragm pumps, augers, impellers, or any other suitable solid transport device. The transport device may also be used as a mixer or blender of the different fuel slurry components.

Prior to entering a gasifier 54, the second fuel slurry 50 may be directed to a holding tank 56. The holding tank 56 may include an agitation mechanism such as, but not limited to a paddle pump, mixer, or a blender, to maintain a homogeneous mixture of the second fuel slurry 50. That is, the agitation mechanism may keep the second fuel slurry 50 from settling. The holding tank 56 may be used to store the second fuel slurry 50 at a desired temperature and pressure. For example, the holding tank 56 may include a pressurized chamber for containing the second fuel slurry 50. The pressurized chamber may be a pressure vessel or negative pressure vessel (e.g., vacuum chamber). Enclosing the second fuel slurry 50 in such a pressurized chamber may block the holding tank 56 from releasing volatile components from the second fuel slurry 50 to an outside atmosphere. In addition, the holding tank 56 may isolate the second fuel slurry 50 from the outside atmosphere, so that it does not interact with oxygen before reaching the gasifier 54. In some embodiments, there may be no holding tank between the transport device 48 and the gasifier 54, while in others there may be multiple such holding tanks 56 and/or other pressurized vessels for conveying the second fuel slurry 50 to the gasifier 54.

Once the second fuel slurry 50 has been prepared within a desired concentration, temperature, and/or viscosity, as described above, the system 30 directs the second fuel slurry 50 from the holding tank 56 to the gasifier 54 through a pump 62. It should be noted that the gasifier 54 may be part of an integrated gasification combined cycle (IGCC) power plant or any other variety of plants that use or produce a syngas 64. The gasifier 54 subjects the second fuel slurry 50 to gasification conditions to produce a syngas 64. In particular, as a result of being subjected to these conditions, the solid fuel 34 in the second fuel slurry 50 reacts with oxygen ($O_2$) and water ($H_2O$) to generate the syngas 64. Generally, the amount of the syngas 64 that is produced, or the efficiency of its production, is limited by, among other things, the size of the gasifier 54 as well as the amount of the solid fuel 34 that enters the gasifier 54. Thus, a higher concentration of the solid fuel 34 in the second fuel slurry 50 means a higher energy content of the second fuel slurry 50, resulting in increased gasification efficiency in producing the syngas 64.

A controller 68 may independently control operation of the components of the system 30 and the compositional parameters of the fuel slurries (e.g., the first fuel slurry 40, the first intermediate fuel slurry 42, and the second fuel slurry 50) by controlling valves, pumps, or other flow adjusting features throughout the system 30. For example, the controller 68 may include devices employing a general purpose or an application-specific processor, both of which may generally include memory circuitry for storing instructions such as parameters for the fuel slurries 40, 42, 46, and 50. The processor may include one or more processing devices, and the memory may include one or more tangible, non-transitory, machine-readable media collectively storing instructions executable by the processor to perform the acts of FIG. 1, discussed above, and FIG. 4, as discussed below, and control actions described herein. Moreover, in other embodiments, the memory circuitry may store instructions for the gasification conditions of the second fuel slurry 50.

In one embodiment, the controller 68 may operate measuring and/or flow control devices 70, 72, 74, 76, and 78, as well as the pump 62 to control amounts and/or flows between the different system components. It should be noted that there may be additional measuring and/or flow control devices throughout the system 30 used to adjust different amounts and/or flows between the system components. In the illustrated embodiment, the controller 68 governs operation of the control devices, such as the control device 70, to adjust a flow of the solid fuel 34 to the first and/or the second slurry preparation systems, 32 and 44, respectively. In certain embodiments, the control device 70 may be part of a weighing mechanism that measures the amount of the solid fuel 34 before it enters the slurry preparations systems 32 and 44. The controller 68 may also control the control device 72 to adjust a flow of the first liquid 36 to the first slurry preparation system 32. Furthermore, the controller 68 may adjust a flow of the first fuel slurry 40 and/or the second intermediate fuel slurry 46 used to prepare the second fuel slurry 50. In addition, the controller 68 may also adjust a flow of the second slurry 50 that enters the gasifier 54.

Figure 3:
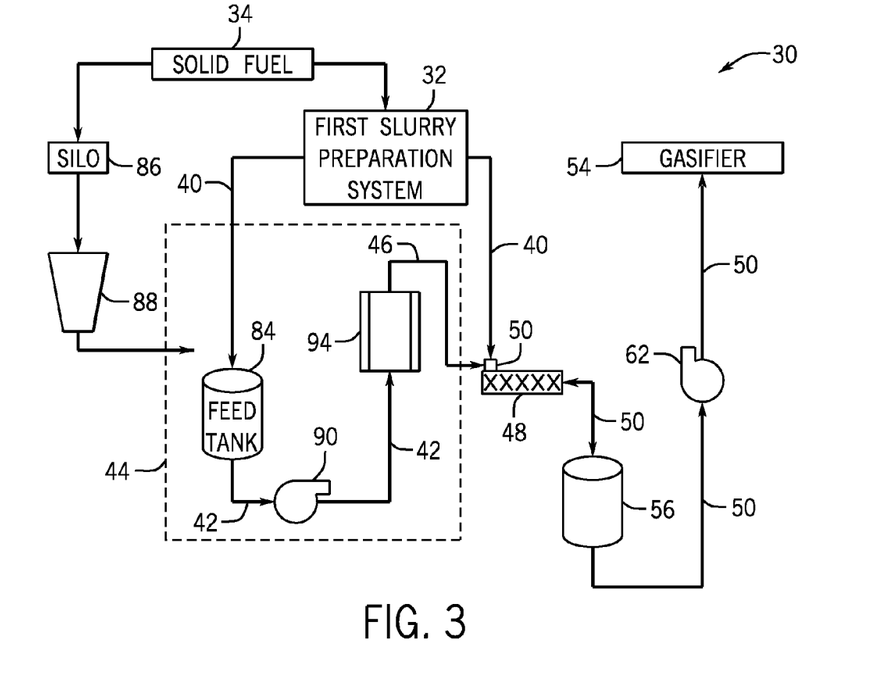
FIG. 3 is a block diagram of an embodiment a feedstock preparation system as illustrated in FIG. 2 including a second slurry preparation system.

Turning now to FIG. 3, an embodiment of the feedstock preparation system 30 that prepares the second fuel slurry 50 during operation according to the acts of method 10 (FIG. 1) is shown. In the illustrated embodiment, the feedstock preparation system 30 prepares the first fuel slurry 40 in the first slurry preparation system 32, as described above. Following preparation of the first fuel slurry 40, the first portion of the first fuel slurry 40 is directed into a feed tank 84 within the second slurry preparation system 44. While in the feed tank 84, the first portion of the fuel slurry 40 is mixed with the second portion of the solid fuel 34 to produce the first intermediate fuel slurry 42. It should be noted, that the second portion of the solid fuel 34 may be stored in a silo 86 and/or processed in a crusher 88 prior to entering the feed tank 84. In certain embodiments, the crusher 88 may crush the second portion of the solid fuel 34 such that the particle size is the same, smaller, or larger than the first portion of the fuel source 34. For example, the crusher 88 may crush the second portion of the fuel source 34 such that it is approximately between 10% and 25% less than the particle size of the first portion of the solid fuel 34. In other embodiments, the second portion of the solid fuel 34 having a desired particle size may also be fed directly to the transport device 48.

Once the first intermediate fuel slurry 42 has been prepared, a pump 90 pumps the first intermediate fuel slurry 42 away from the feed tank 84 and into a grinder 94 that pulverizes the solid fuel 34 in the first intermediate fuel slurry 42 into fine particles (e.g., the second particle size distribution) to produce the second intermediate fuel slurry 46 (e.g., in accordance with block 18 (FIG. 1)). For example, the solid fuel 34 in the second intermediate fuel slurry 46 may have an average particle size of between 10% and 500% smaller than the average particle size of the solid fuel 34 in the first fuel slurry 40. In one embodiment, the second intermediate fuel slurry 46 may have fine particles of the solid fuel 34 with an average particle size of between 20% and 400%, 30% and 300%, 40% and 200%, and/or, 50% and 100% smaller than the particles of the solid fuel 34 in the first fuel slurry 40 and the first intermediate fuel slurry 42.

In one embodiment, the second slurry preparation system 44 may utilize a wet milling process to mix and grind the first intermediate fuel slurry 42 to generate the second intermediate fuel slurry 46. Accordingly, the grinder 94 may include an attritor mill, or similar feature, to produce the fine particles of the solid fuel 34 in the second intermediate fuel slurry 46. As discussed above, the grinder 94 may generate solid fuel particles that may range from between 10% and 500% smaller than the solid fuel particles in the first fuel slurry 40 and first intermediate fuel slurry 42. The second slurry preparation system 44 is not limited to a single piece of machinery used to generate the second intermediate fuel slurry 46. In some embodiments, the slurry preparation system 44 may include multiple milling units, in any combination, in series or in parallel, to prepare the second intermediate fuel slurry 46 from its constituents. It should be noted that the first slurry preparation system 32 may also be configured to generate the first and second intermediate fuel slurries, 42 and 46.

As discussed above, with reference to FIG. 2, the second intermediate fuel slurry 46 may be transported and mixed with the second portion of the first fuel slurry 40 using the transport device 48 to generate the second fuel slurry 50. The second fuel slurry 50 may be stored in the holding tank 56 prior to being pumped, via pump 62 into the gasifier 54. The second fuel slurry 50 may have a ratio of the first fuel slurry 40 and the second intermediate fuel slurry 46 such that the particle size distribution (e.g., the first particle size and the second particle size) in the second fuel slurry 50 yields a viscosity suitable for pumping into the gasifier 54. For example, the viscosity of the second fuel slurry 50 may be equal to or less than the viscosity of the first fuel slurry 40 and/or the second intermediate fuel slurry 46. Furthermore, the ratio of the first fuel slurry 40 and the second intermediate fuel slurry 46 may be such that a more stable second fuel slurry 50, compared to the first fuel slurry 40, may be produced. Therefore, by controlling the ratio of the first fuel slurry 40 and the second intermediate fuel slurry 46 in the second fuel slurry 50 the viscosity of the second fuel slurry 50 may be adjusted. Accordingly, a stable (e.g., non-settling and flowable) and pumpable fuel slurry for gasification in gasifier 54 may be generated. In one embodiment, the second fuel slurry 50 may have a viscosity approximately equal to the first fuel slurry 40. In another embodiment, the second fuel slurry 50 may have a viscosity higher than the first fuel slurry 40. In yet a further embodiment, the viscosity of the second fuel slurry 50 may be lower than that of the first and the second intermediate fuel slurries, 42 and 46, but, in certain embodiments, still greater than the first fuel slurry 40.

As discussed above, the second fuel slurry 50 is a mixture including the first fuel slurry 40 and the second intermediate fuel slurry 46. Accordingly, the second fuel slurry 50 may have a concentration of the solid fuel 34 that is approximately 1% and 40% higher than the concentration of the solid fuel 34 in the first fuel slurry 40. In certain embodiments, the concentration of the solid fuel 34 may be between 10% and 100% higher than the first fuel slurry 40. In other embodiments, the concentration of the solid fuel 34 may be between 15% and 25% higher than the first fuel slurry 40. Therefore, the second fuel slurry 50 may provide more fuel for gasification compared to the first fuel slurry 40. In other words, the second fuel slurry 50 may have a greater energy content compared to the first fuel slurry 40.

As noted above, because the solid fuel 34 is provided to the gasifier 54 as a part of the second fuel slurry 50, it may be desirable to maximize the amount of the solid fuel 34 contained within the second fuel slurry 50. The amount of the solid fuel 34 contained within the second fuel slurry 50 may be considered to be a solids concentration of the second fuel slurry 50 and is generally represented as a percentage (e.g., by weight). The solids concentration of the second fuel slurry 50 may be advantageously increased by mixing the first fuel slurry 40 and the second intermediate fuel slurry 46, as described above. To achieve a desired solids concentration, the second fuel slurry 50 may include the first fuel slurry 40 and the second intermediate fuel slurry 46, in certain predetermined ratios. For example, the first fuel slurry 40 and the second intermediate fuel slurry 46 may be combined in a ratio of between 1:0.25 to 3:2, such as 1:1, 1:0.5, 2:1, 3:1, or any other suitable ratio. Such combination of the first fuel slurry 40 and the second intermediate fuel slurry 46, may lead to an increase of between 1% and 40% more solid fuel 34. For example, such increase may be approximately 1%, 2%, 3%, 4%, 5%, 6%, 7%, 8%, 9%, 10%, or more of the solids concentration (e.g., weight percentage of the solid fuel 34 in the second slurry 50). It should be noted that, an increase between 2% and 4% of the solids concentration may provide noticeable improvements in the carbon conversion of low rank coal taking place during gasification, because of the additional amount of carbon and oxygen available for partial oxidation.

Figure 4:
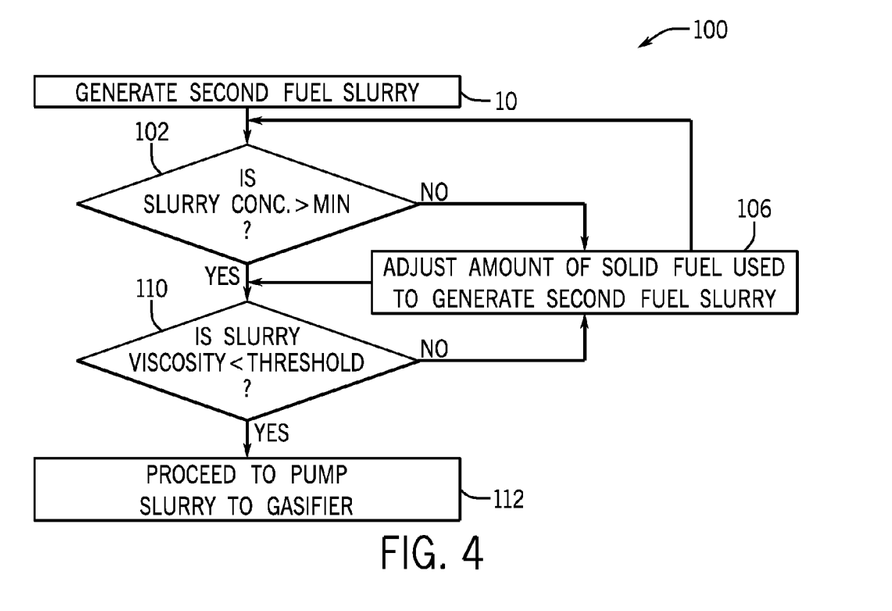
FIG. 4 is a block diagram of an embodiment of a method for adjusting a solids concentration and viscosity of a fuel slurry.

FIG. 4 illustrates a process flow diagram of an embodiment of a method 100 for adjusting the amount of the solid fuel 34 in the second fuel slurry 50 based on properties such as viscosity and solids concentration of the second fuel slurry 50. Upon generating the second fuel slurry 50 according to the acts of method 10 in FIG. 10, the controller 68 may determine (e.g., based on signals from the gasifier 54) whether the second fuel slurry 50 has a solids concentration above a desired minimum solids concentration (query 102).

In embodiments where the second fuel slurry 50 does not have a sufficient solids concentration, the method 100 may adjust the amount of the solid fuel 34 used to generate the second fuel slurry 50 (block 106).

For example, the controller 68 may adjust an amount of the first portion of the first fuel slurry 40 (e.g., in the first intermediate fuel slurry 42), the second portion of the first fuel slurry 40, the second intermediate fuel slurry 46, or any combination thereof used to generate the second fuel slurry 50. In making these adjustments, the controller 68 may control the control devices 74 and 76 to adjust the amount of the first fuel slurry 40 from the first slurry preparation system 32 to the second slurry preparation system 44 and/or the transport device 48, respectively. Moreover, in certain embodiments, the controller 68 may also control the control device 78 to adjust the flow of the second intermediate fuel slurry 46 from the second slurry preparation system 44 entering the transport device 48. In other embodiments, the controller 68 may also adjust the amount of the first liquid 36 and/or the solid fuel 34 used to prepare the first fuel slurry 40 and/or the first intermediate fuel slurry 42. In other embodiments, the controller 68 may also adjust the amount of viscosity modifiers (e.g., one or more additives) in the first liquid 36 or in the streams producing the first intermediate fuel slurry 42 or the second intermediate fuel slurry 46. It should be noted that one or a combination of these adjustments may be made, and any and all permutations of combinations are presently contemplated.

In embodiments where the solids concentration of the second fuel slurry 50 is above a desired minimum, the method 100 progresses to determine whether the viscosity of the second fuel slurry 50 is below a threshold viscosity (query 110).

The controller 68 may determine the desired relative amounts of the second portion of the fuel slurry 40 and the second intermediate fuel slurry 46 based on signals indicative of the viscosity of the second fuel slurry 50. For example, the pumpability, flow velocity, pore penetration, and/or similar measurements of the second fuel slurry 50 may prompt the controller 68 to adjust the amount of the solid fuel used to generate the second fuel slurry 50. Accordingly, in embodiments where the viscosity of the second fuel slurry 50 is above the threshold viscosity the controller 68 may adjust the ratio of the second portion of the first fuel slurry 40 and the second intermediate fuel slurry 48 such that the ratio of the first fuel slurry 40 and the second intermediate fuel slurry 48 yields a particle size distribution that generates a desirable viscosity. Furthermore, in other embodiments, the controller 68 may adjust the amount of additives in the liquid 36, such as but not limited to, friction reducers. In embodiments where the viscosity of the second fuel slurry 50 is below the threshold viscosity, the method 100 proceeds to pump the second fuel slurry 50 into the gasifier 54 (block 112). For example, the controller 68 may pump the second fuel slurry 50 via pump 62 into the gasifier 54.

The flow and/or amount of the solid fuel 34, the liquid 36, the first fuel slurry 40, the second intermediate fuel slurry 46, and the second fuel slurry 50 may also be controlled based on an operational state of the gasifier 54. For example, the control devices 70, 72, and 76 may be opened to supply the fuel slurry components (e.g., the solid fuel 34, the first liquid 36, and/or the first portion of the first fuel slurry 40) to the respective slurry preparation systems, 32 and 40, during gasifier startup and closed to stop the supply of the fuel slurry components during gasifier shutdown. In some embodiments, the pump 62 may be opened to supply the second fuel slurry 50 from the holding tank 56 to the gasifier 54 during gasifier startup and closed to stop the supply of the second slurry 50 during gasifier shutdown.

Technical effects of the present embodiments include, among other things, the ability to increase the solids concentrations of fuel slurries used in gasification systems, reduce the viscosity, and modify other rheological properties of the slurry. Indeed, the use of a novel feedstock preparation system for generating a fuel slurry may enable an increase in the amount of carbon and oxygen available in the slurry for partial oxidation in the gasifier. Accordingly, low rank coal and other solid fuels, which typically only generate low solids concentrations, may also be used to generate concentrated fuel slurries.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A feedstock preparation system, comprising:
   a first slurry preparation system comprising a first grinder and configured to receive a first portion of a solid fuel and to generate a first fuel slurry using the first portion of the solid fuel and a liquid;
   a first fuel path extending between the first slurry preparation system and a fuel source, wherein the first fuel path is configured to direct the first portion of the solid fuel to the first slurry preparation system; and
   a second slurry preparation system separate from the first slurry preparation system and comprising a second grinder and a feed tank fluidly coupled to the second grinder, wherein the second slurry preparation system is configured to receive a second portion of the solid fuel and a first portion of the first fuel slurry and to produce a first intermediate fuel slurry using the second portion of the solid fuel and the first portion of the first fuel slurry, and to produce a second intermediate fuel slurry from the first intermediate fuel slurry using the second grinder;
   a second fuel path separate from the first fuel path and extending between the second slurry preparation system and the fuel source, wherein the second fuel path is configured to direct the second portion of the solid fuel to the feed tank, and wherein the feed tank is configured to mix the second portion of the solid fuel and the first portion of the fuel slurry to produce the first intermediate slurry; and
   wherein the feedstock preparation system is configured to produce a second fuel slurry from the second intermediate fuel slurry and the first fuel slurry, and wherein the first fuel slurry has a first particle size distribution and the second fuel slurry has a second particle size distribution, and the first and second particle size distributions are different.

2. The feedstock preparation system of claim 1, wherein the second grinder comprises a wet mill configured to grind the first intermediate fuel slurry to produce the second intermediate fuel slurry.

3. The feedstock preparation system of claim 2, comprising a transport device disposed downstream from and fluidly coupled to the first and second slurry preparation systems, wherein the transport device is configured to receive the second intermediate fuel slurry and a second portion of the first fuel slurry and to mix the second intermediate fuel slurry and the second portion of the first fuel slurry to produce the second fuel slurry.

4. The feedstock preparation system of claim 3, wherein the transport device comprises an auger, a conveyer, an impeller, or combination thereof.

5. The feedstock preparation system of claim 1, wherein the first and second slurry preparation systems are configured to introduce a slurry additive to control the viscosity of the first fuel slurry, the first intermediate fuel slurry, or the second intermediate fuel slurry.

6. The feedstock preparation system of claim 1, comprising a storage unit fluidly coupled to a transport device and disposed upstream of a gasifier, wherein the storage unit is configured to receive the second fuel slurry from the transport device.

7. The feedstock preparation system of claim 6, wherein the storage unit comprises a pressurized vessel.

8. The feedstock preparation system of claim 6, wherein the storage unit is configured to supply the second fuel slurry to the gasifier, and wherein the gasifier is configured to produce a syngas at least using the second fuel slurry.

9. The feedstock preparation system of claim 1, comprising a controller configured to control compositional parameters of the second fuel slurry.

10. The system of claim 9, wherein the controller is communicatively coupled to the first slurry preparation system, the second slurry preparation system, and a gasifier, wherein the controller is configured to adjust an amount or a flow of fuel slurry components into the first slurry preparation system, the second slurry preparation system, or the gasifier.

11. The system of claim 1, wherein the first grinder is configured to grind the first portion of the solid fuel such that the first fuel slurry has the first particle size distribution and the second grinder is configured to grind the second portion of the solid fuel and the first portion of the first fuel slurry such that the second fuel slurry has the second particle size distribution.

12. A method comprising:
   providing a first portion of a solid fuel to a first slurry preparation system via a first fuel path extending between the first slurry preparation system and a fuel source to generate a first fuel slurry, wherein the first slurry comprises ground particles of the solid fuel, and wherein the first slurry preparation system comprises a first grinder configured to generate the ground particles of the solid fuel;
   providing a second portion of the solid fuel and a first portion of the first fuel slurry to a second slurry preparation system via a second fuel path extending between the fuel source and the second slurry preparation system, the first and second fuel paths being separate from one another, wherein the second fuel path is configured to direct the second portion of the solid fuel to a feed tank, and wherein the feed tank is configured to mix the second portion of the solid fuel and the first portion of the first fuel slurry to produce an intermediate slurry;
   grinding the mixture of the second portion of the solid fuel and the first portion of the first fuel slurry in a second grinder disposed in the second slurry preparation system and fluidly coupled to the feed tank to produce a second fuel slurry, wherein the second fuel slurry has a smaller particle size distribution of the solid fuel compared to the first fuel slurry; and mixing a second portion of the first fuel slurry and the second fuel slurry to produce a third fuel slurry.

13. The method of claim 12, wherein the second grinder comprises a wet milling unit.

14. The method of claim 12, comprising transporting the second fuel slurry with a device, wherein the device is configured to transport solids from the second slurry preparation system to a blending unit, wherein the device configured to transport solids comprises the blending unit.

15. The method of claim 14, comprising mixing the second fuel slurry with a portion of the first fuel slurry in the blending unit to produce the third fuel slurry.

16. The method of claim 15, comprising transporting the third fuel slurry to a storage unit with the device.

17. The method of claim 16, comprising supplying the third fuel slurry to a gasifier and gasifying the solid fuel in the third fuel slurry to produce a syngas.

* * * * *